(12) United States Patent
Gabler et al.

(10) Patent No.: US 7,665,762 B2
(45) Date of Patent: Feb. 23, 2010

(54) GAS GENERATOR

(75) Inventors: Michael Gabler, Muehldorf (DE); Karl Englbrecht, Erharting (DE); Daniel Kraus, Trostberg (DE); Stefan Labitzke, Rostock (DE); Thomas Nobach, Waldkraiburg (DE); Helmut Pritz, Ampfing (DE); Johann Seidl, Toeging (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 0 days.

(21) Appl. No.: 12/154,994

(22) Filed: May 29, 2008

(65) Prior Publication Data

US 2008/0296877 A1  Dec. 4, 2008

(30) Foreign Application Priority Data

May 30, 2007 (DE) .................. 20 2007 007 597 U
Apr. 14, 2008 (DE) ...................... 10 2008 018 766

(51) Int. Cl.
*B60R 21/26* (2006.01)

(52) U.S. Cl. ................... 280/736; 280/737; 280/741; 280/742

(58) Field of Classification Search ............. 280/736, 280/741, 737, 742
See application file for complete search history.

(56) References Cited

U.S. PATENT DOCUMENTS

| 5,195,777 | A | 3/1993 | Cuevas |
| 5,551,723 | A | 9/1996 | Mahon et al. |
| 5,700,030 | A | 12/1997 | Goetz |
| 2003/0025313 | A1 | 2/2003 | Sawa et al. |
| 2006/0197325 | A1* | 9/2006 | Patterson ............... 280/737 |
| 2006/0202457 | A1* | 9/2006 | Patterson ............... 280/740 |

FOREIGN PATENT DOCUMENTS

| DE | 4305035 | 8/1993 |
| DE | 19526547 | 1/1996 |
| EP | 0570347 | 11/1993 |
| WO | 0021799 | 4/2000 |

* cited by examiner

*Primary Examiner*—Eric Culbreth
(74) *Attorney, Agent, or Firm*—Tarolli, Sundheim, Covell & Tummino LLP

(57) ABSTRACT

A gas generator for a vehicle occupant restraint system a rigid outer housing (12), a chamber (14) formed in the outer housing (12), in which a compressed gas is present at least upon activation of the gas generator (10), a component immovable (20; 34; 62) relative to the outer housing (12), at least one outflow opening (22) formed in the immovable component (20; 34; 62), and a least one resilient element (26), which is clamped inside the outer housing (12) and rests against the immovable component (20; 34; 62) at least in its normal position. In its normal position, the resilient element (26) closes a flow path between the chamber (14) and external surroundings of the gas generator (10) and is deformed elastically under the influence of compressed gas, whereby it clears a flow cross-section (30) whose size is increasing with increasing pressure.

20 Claims, 7 Drawing Sheets

GAS GENERATOR

TECHNICAL FIELD

This invention relates to a gas generator, in particular for a vehicle occupant restraint system.

BACKGROUND OF THE INVENTION

Such gas generator serves to generate compressed gas, by means of which for instance a gas bag of the vehicle occupant restraint system is filled in a case of restraint. For this purpose, the gas generator can include a chamber with stored cold gas, which is released upon activation of the gas generator. Alternatively or in addition (the latter in the case of so-called hybrid gas generators), the gas generator includes a combustion chamber with a pyrotechnical propellant, upon deflagration of which compressed gas is generated. The gas released upon activation of the gas generator emerges from the gas generator through one (or more) outflow opening(s), the outflow opening usually being closed by a sealing material or membrane prior to activation. Once the outflow opening is opened, it has a constant cross-section. However, the outflow cross-section influences the combustion chamber pressure and hence in turn the deflagration behavior of the propellant, in particular in terms of generator performance, gas yield and generation of noxious gases. For this reason, it is desirable that the pressure existing in the combustion chamber does not fall below a certain level.

Therefore, it is the object of the invention to create a gas generator, in which an outflow cross-section is controllable in dependence on the internal pressure.

BRIEF SUMMARY OF THE INVENTION

This is achieved in a gas generator, in particular for a vehicle occupant restraint system, comprising a rigid outer housing, a chamber formed in the outer housing, in which a compressed gas is present at least upon activation of the gas generator, a component immovable, at least one outflow opening formed in the component immovable relative to the outer housing, and at least one substantially flat, resilient element, which is clamped inside the outer housing and rests against the immovable component at least in its normal position. In its normal position, the resilient element closes a flow path between the chamber and external surroundings of the gas generator and is deformed elastically under the influence of compressed gas, whereby it clears a flow cross-section whose size is increasing with increasing pressure. By means of the spring element, a variable flow cross-section and hence a variable outflow of the gas generator thus is achieved in dependence on the internal pressure. While comparatively little gas flows out in the case of a low internal pressure, a high outflow of gas from the generator is obtained in the case of a high internal pressure due to the increased flow cross-section. In this way, the internal pressure, in particular in a combustion chamber, thus can be kept substantially constant during the entire operating period of the gas generator. Moreover, in the gas generator of the invention, the minimum pressure required for clearing the flow cross-section can be adjusted almost as desired due to a defined bias of the resilient element in the normal position. Since the resilient element is deformed elastically, it is also ensured that in the case of a pressure relief the flow cross-section is reduced again down to the complete closure of the outflow opening. In the case of a pyrotechnical gas generator or a pyrotechnical stage of a hybrid gas generator, the deflagration behavior of the propellant thus can be improved. By means of the resilient element, the invention creates a gas generator of a simple design, as the resilient element itself closes the flow path and not for instance a valve body biased by a helical spring.

In accordance with a first embodiment of the invention, the immovable component is a closing element of the chamber in which the outflow opening is arranged, preferably approximately centrally.

At least in its normal position, the resilient element then rests against the closing element so as to radially surround the outflow opening on the outside, i.e. the outflow opening is circumferentially surrounded by the resilient element.

Together with a membrane, the closing element forms a preassembled unit which closes the outflow opening prior to activation of the gas generator. Upon activation of the gas generator, the membrane is destroyed, and compressed gas can escape through the outflow opening (provided a high enough pressure exists for deforming the resilient element).

For directing the compressed gas, which passes the flow cross-section, from the outer housing of the gas generator for instance into a gas bag, the outer housing has at least one exit opening preferably in the vicinity of the closing element.

In a preferred aspect, the resilient element not only rests against the immovable component, but also directly rests on the outer housing, at least in its normal position, and thus is clamped between the outer housing and the immovable component. This results in a particularly simple and space-saving construction of the gas generator of the invention.

In another aspect, at least in its normal position the resilient element indirectly rests on the outer housing in addition to resting against the immovable component.

In accordance with an alternative embodiment of the invention, the immovable component is a cap arranged inside the chamber, which surrounds an opening of the chamber. The cap in particular is pot-shaped and closes a flow path in the direction of the opening, as long as the resilient element is in its normal position. In the non-activated condition, the opening can again be closed by a membrane.

Alternatively, the immovable component is a component of the diffuser arranged outside the chamber.

The immovable component preferably includes a plurality of outflow openings arranged on its periphery, which in the normal position are closed by the resilient element(s). There is again obtained a simple and space-saving construction.

The resilient element(s) preferably rest(s) against the periphery of the immovable component.

In all aspects of the invention, the resilient element can be arranged downstream of the outflow opening.

In an alternative aspect, the resilient element is arranged upstream of the outflow opening, in particular inside the chamber.

A particularly simple configuration is obtained in that a disc spring is used as resilient element, which as a mass-produced article is available at low cost.

It is, however, also possible to use a plurality of disc springs, which form a disc spring pack or column. The springs can be arranged in a series or parallel connection. In such an aspect, the flow cross-section is formed either between two disc springs or between one disc spring and the outer housing or between a disc spring and the immovable component.

In particular, a plurality of disc springs can be provided, which are arranged one above the other and complement each other to form a bellows-like structure.

The resilient element can have the shape of a spherical shell portion. In this case as well, the resilient element preferably is clamped between the outer housing and the immovable component in the normal position.

Alternatively, the resilient element has the shape of a spherical cap.

The gas generator preferably is a hybrid gas generator, which includes both a combustion chamber with pyrotechnical propellant and a container with stored cold gas. In addition, however, a purely pyrotechnical gas generator also is conceivable. Even in the case of a pure cold gas generator, the invention can be used advantageously.

In the case of a hybrid gas generator, the chamber in particular is a cold gas container, which prior to activation of the gas generator is closed by a membrane.

BRIEF DESCRIPTION OF THE PREFERRED EMBODIMENTS

Figure 1:
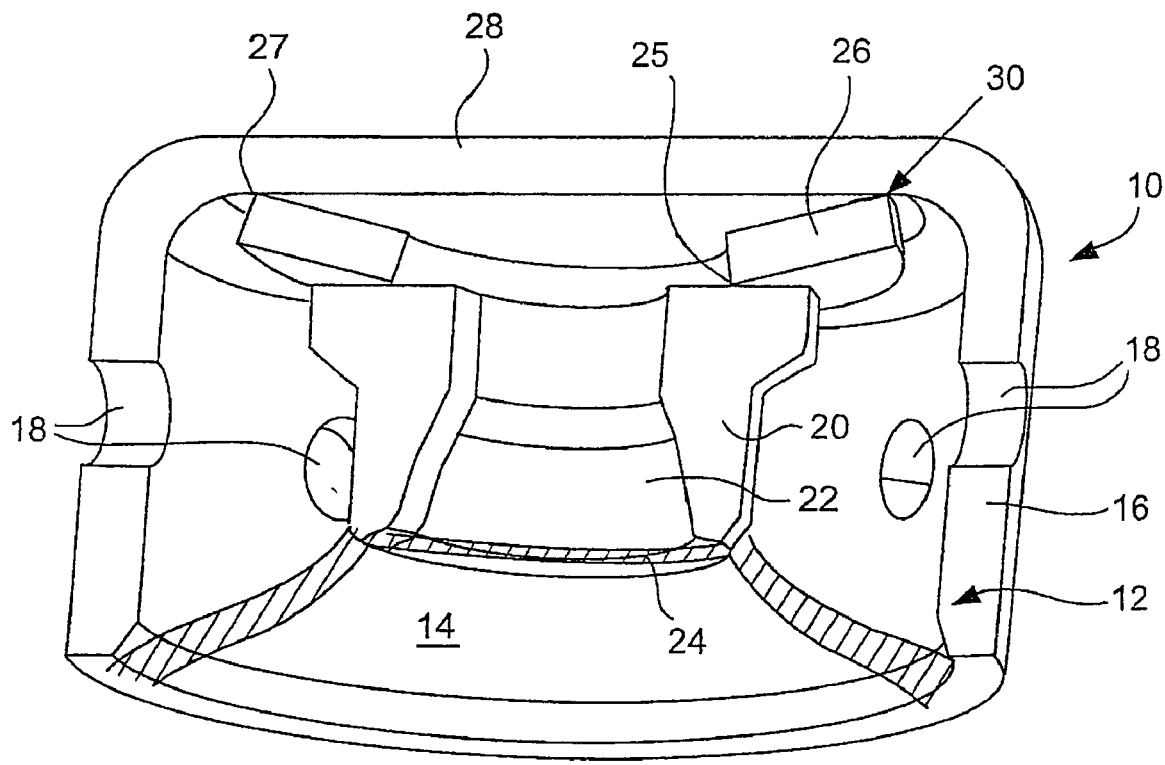
FIG. 1 shows a perspective sectional view of a diffuser portion of a gas generator in accordance with a first embodiment of the invention.
Figure 2:
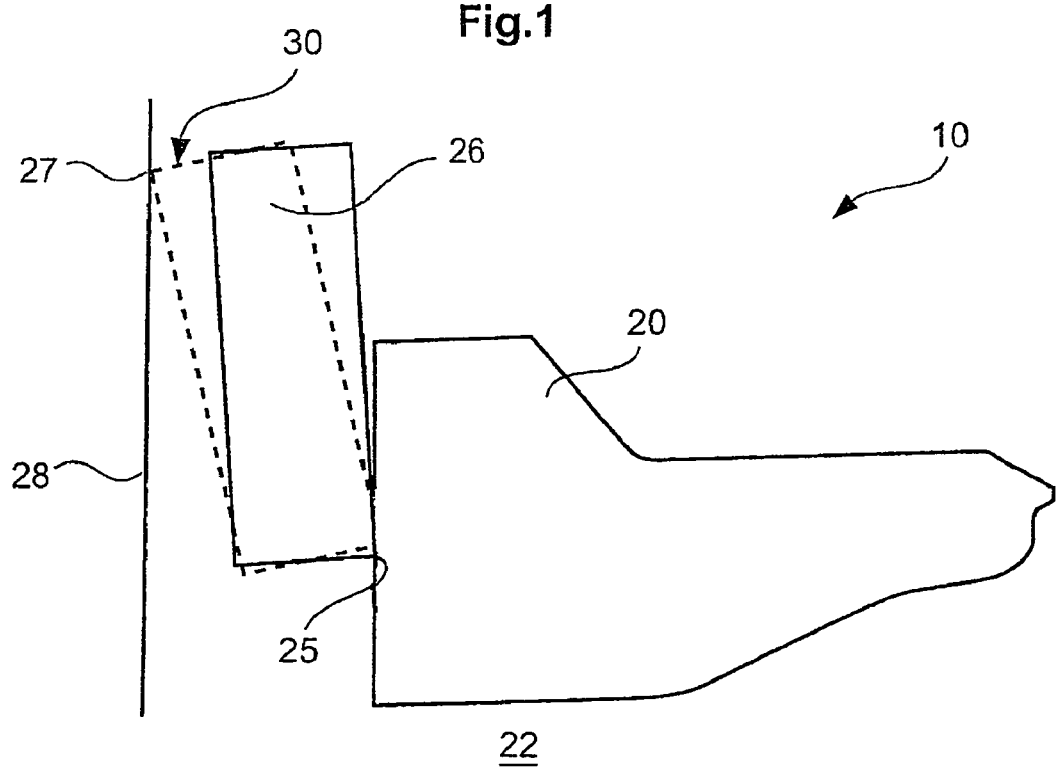
FIG. 2 shows a schematic representation of the flow cross-section of the gas generator of FIG. 1 both in the open and in the closed condition.

FIGS. 1 and 2 show sections of a gas generator 10 for a vehicle occupant restraint system, which in particular is a hybrid gas generator. The gas generator 10 has a rigid outer housing 12, in which a chamber 14 in the form of a cold gas container is formed, only an outline of the chamber being represented here. A part of the outer housing 12 constitutes a diffuser portion 16, which includes a plurality of exit openings 18 distributed along its periphery. The chamber 14 is defined by a closing element 20, which is a component immovable relative to the outer housing 12. About centrally in the closing element 20, an outflow opening 22 is formed, which prior to activation of the gas generator 10 is closed by a membrane 24 disposed on the side of the chamber. With the closing element 20, the membrane 24 forms a preassembled unit.

Inside the outer housing 12 or the diffuser portion 16, a flat resilient element 26 is provided in the form of a disc spring, which in its normal position rests on the closing element 20, i.e. the immovable component, with its inner edge 25, and with its outer edge 27 directly rests on the outer housing 12, here on the end-face wall 28 of the diffuser portion 16. The resilient element 26 substantially is flat and rests against the immovable component, here the closing element 20, and radially surrounds the outflow opening 22 on the outside. In the normal position (FIG. 1 and illustrated in broken lines in FIG. 2), the resilient element 26 closes a flow path between the chamber 14 and the external surroundings of the gas generator 10.

Upon activation of the gas generator 10, after the membrane 24 is destroyed, compressed gas is applied to the resilient element 26, which is arranged behind the outflow opening 22 with respect to the flow path of the compressed gas, and the resilient element is deformed elastically (see FIG. 2). There is obtained a flow cross-section 30 between the end-face wall 28 of the diffuser portion 16 and the resilient element 26, whose size is increasing with increasing pressure. When the flow cross-section 30 is cleared, as shown in FIG. 2, compressed gas flows from the interior of the chamber 14 into the diffuser portion 16 and from there through the exit openings 18 disposed in the vicinity of the closing element 20 into the external surroundings of the gas generator 10, here to a gas bag of a vehicle occupant restraint system, which is not shown in the Figures.

Figure 3:
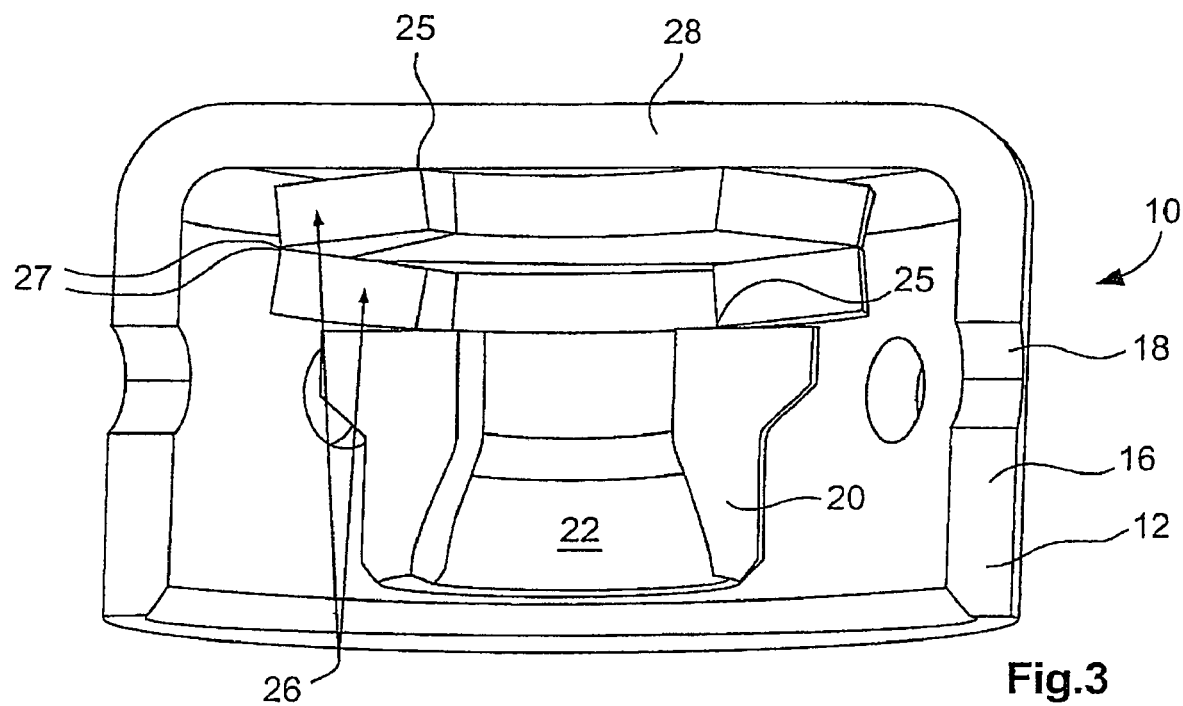
FIG. 3 shows a perspective sectional view of a diffuser portion of a gas generator in accordance with a second embodiment of the invention.
Figure 4:
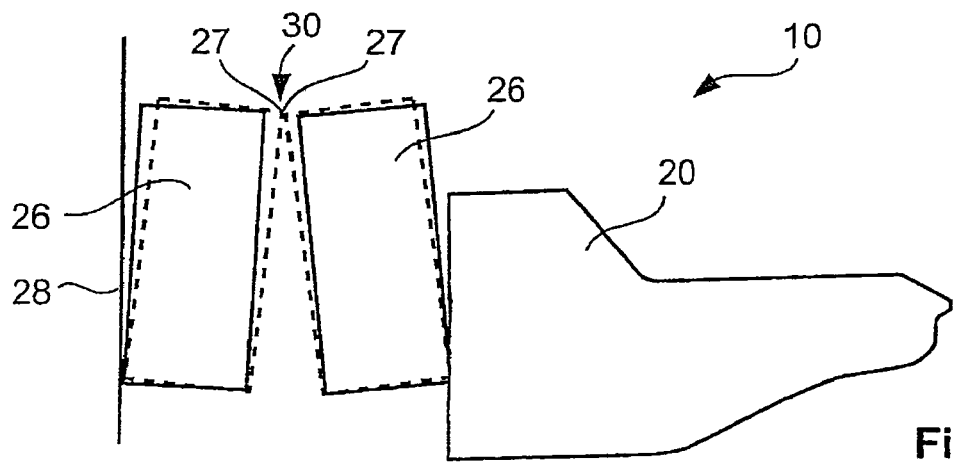
FIG. 4 shows a schematic representation of the flow cross-section of the gas generator of FIG. 3 both in the open and in the closed condition.

FIGS. 3 and 4 show a gas generator 10 in accordance with a second embodiment of the invention, wherein identical components or components having the same function are designated with the same reference numerals, and in the following reference will only be made to the differences to the first embodiment described so far. The representation of the chamber 14 and the membrane 24 was omitted in FIG. 3. Instead of a single resilient element, two resilient elements 26 are provided here, again in the form of disc springs which are connected in series. The disc spring resting against the closing element 20 rests on the closing element 20 with its inner edge 25, and with its outer edge 27 rests on the outer edge 27 of the second disc spring, which in turn rests against the end-face wall 28 of the diffuser portion 16 with its inner edge 25. In this aspect, the flow cross-section 30 is formed between the two disc springs, to be more precise between the outer edges 27 thereof, when enough compressed gas is applied.

Figure 5:
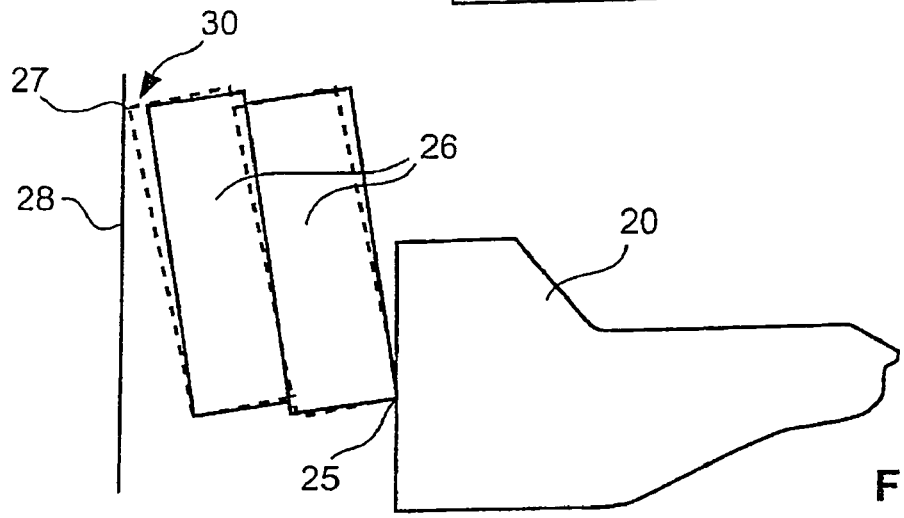
FIG. 5 shows a schematic representation of the flow cross-section of a gas generator slightly modified with respect to FIG. 3 both in the open and in the closed condition.

FIG. 5 shows an arrangement, which is modified with respect to FIG. 3, of two resilient elements 26 in the form of disc springs, which here are connected in parallel, wherein the inner edge 25 of the right-hand disc spring in FIG. 5 rests against the closing element 20, and the outer edge 27 of the left-hand disc spring rests against the end-face wall 28. In this variant, the flow cross-section 30 is obtained between the left-hand disc spring and the end-face wall 28.

Figure 6:
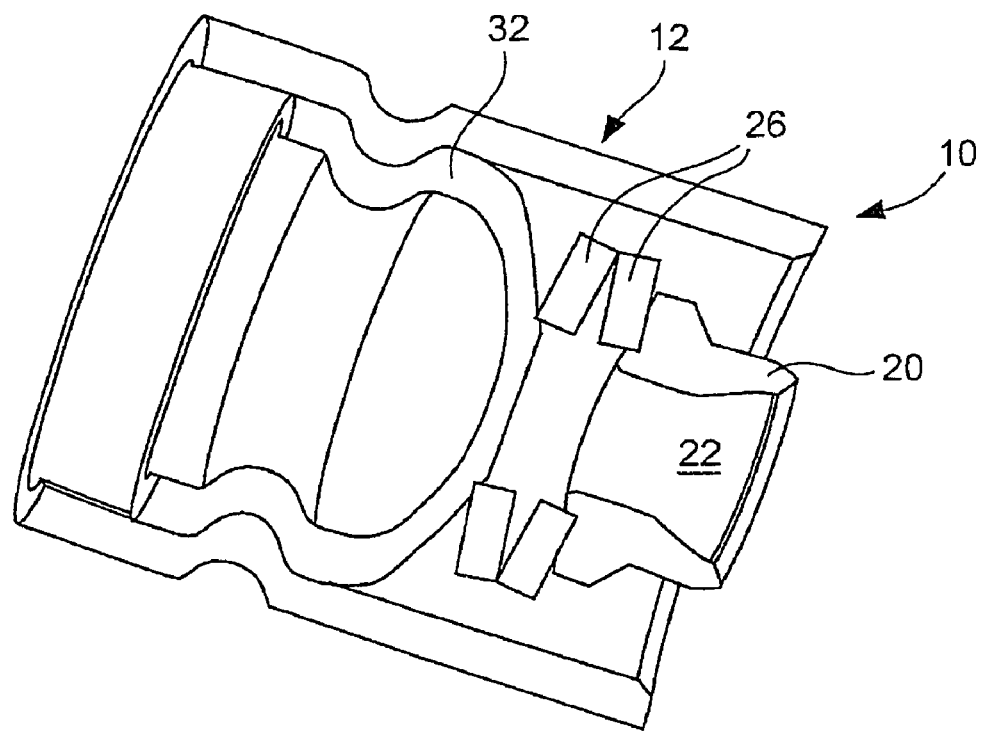
FIG. 6 shows a perspective sectional view of a diffuser portion of a gas generator of the invention in a variant slightly modified with respect to FIG. 3.
Figure 7:
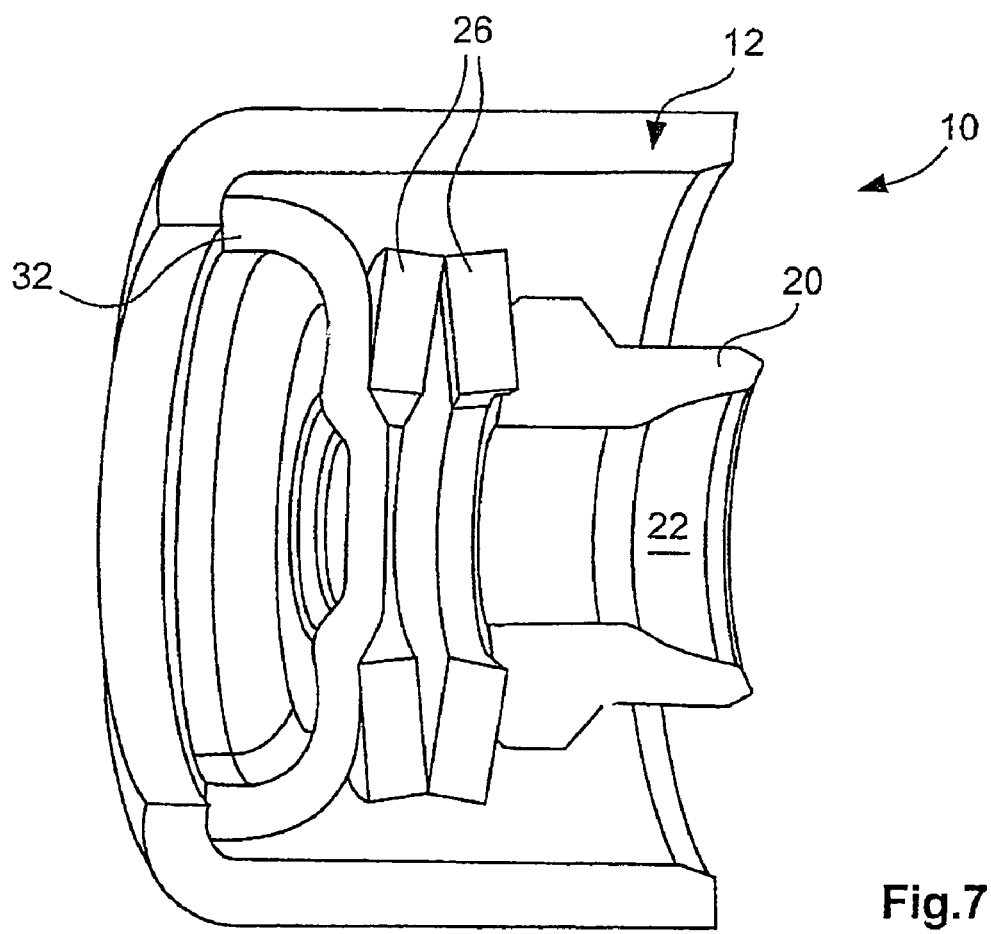
FIG. 7 shows a perspective sectional view of a diffuser portion of a gas generator of the invention in a further variant slightly modified with respect to FIG. 3.

FIGS. 6 and 7 show two variants of the gas generator 10, which are modified with respect to FIG. 3, wherein here the resilient element(s) 26, again series-connected disc springs, do not rest directly on the outer housing 12, but on a stop 32, which is immovable relative to the outer housing and which can be the limit of a second combustion chamber (FIG. 6). The representation of the exit openings 18 and of the chamber 14 together with the membrane 24 was omitted here.

In all variants shown, a plurality of disc springs can of course also be provided instead of two disc springs, in particular disc spring packs of six disc springs have turned out to be advantageous.

Figure 8:
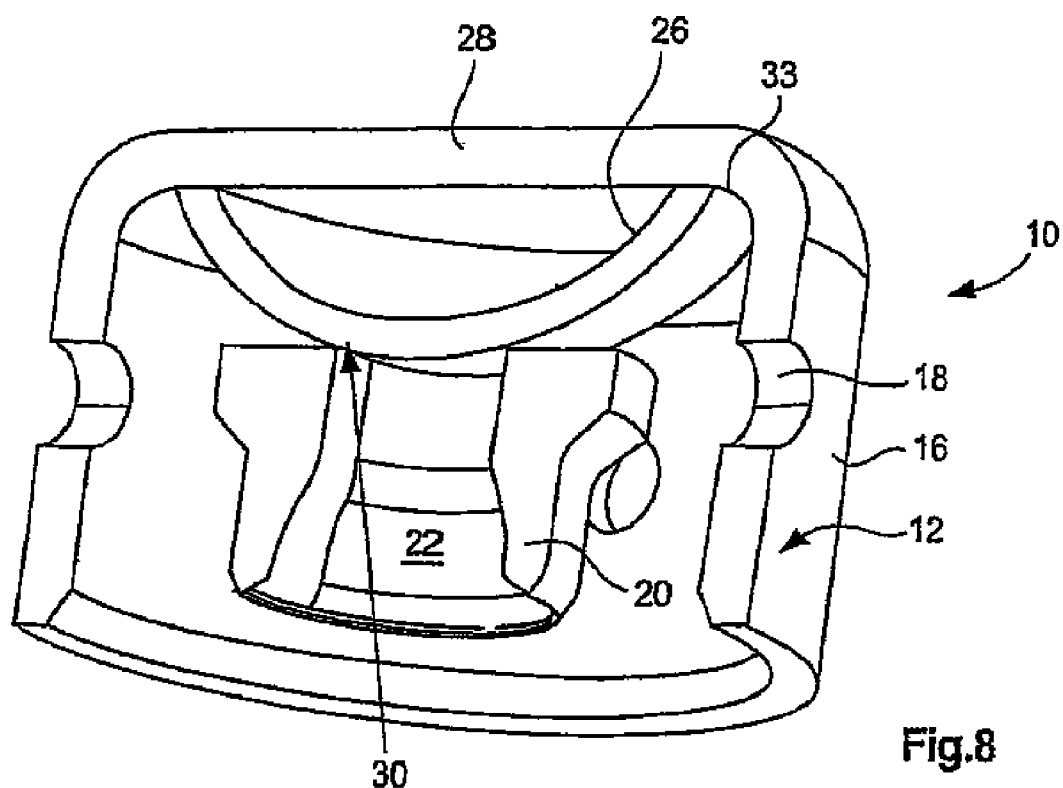
FIG. 8 shows a perspective sectional view of a diffuser portion of a gas generator in accordance with a third embodiment of the invention.

FIG. 8 shows a third embodiment of the gas generator 10 of the invention, which differs from the embodiments described so far in that the resilient element 26 has the shape of a spherical shell portion or a spherical cap. In its edge portion 33, the resilient element 26 rests against the end-face wall 28 of the diffuser portion 16 on the outer housing 12, whereas the middle portion closes the outflow opening 22 in the normal position shown in FIG. 8. Upon application of compressed gas, the flow cross-section 30 is formed between the edge of the outflow opening 22 and the resilient element 26, in that the same is slightly lifted.

Figure 9:
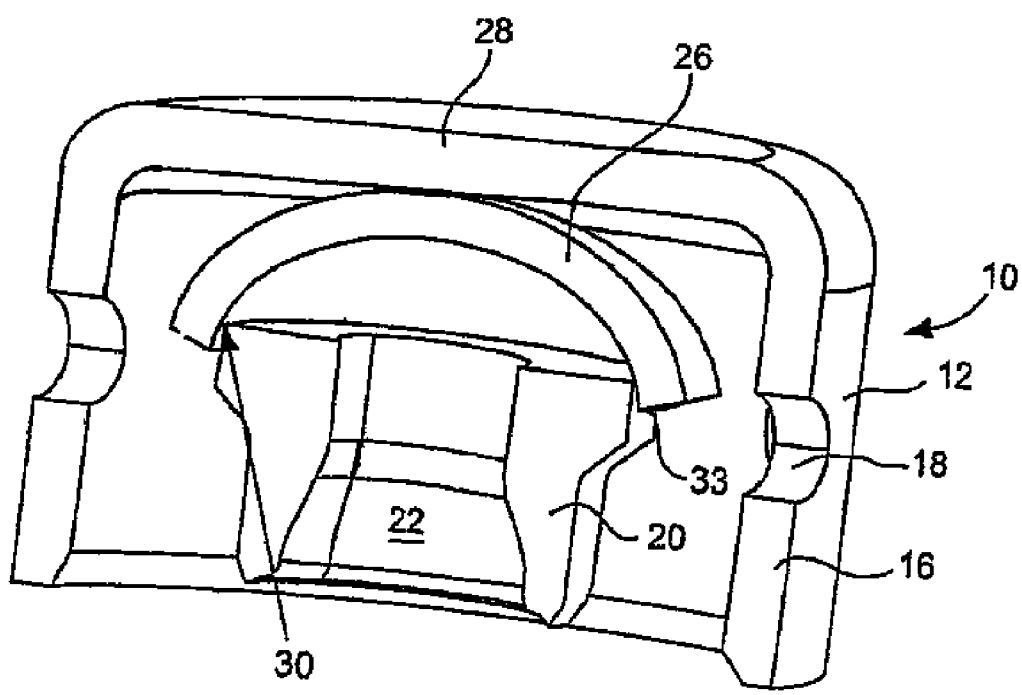
FIG. 9 shows a perspective sectional view of a diffuser portion of a gas generator in accordance with a fourth embodiment of the invention.

The gas generator 10 as shown in FIG. 9 merely differs from the one of FIG. 8 in that the resilient element 26 is arranged rotated by 180°, i.e. rests on the end-face wall 28 in its central portion and on the closing element 20 in its edge portion 33. In this aspect, the flow cross-section 30 is formed on the outer edge of the closing element 20.

Figure 10:
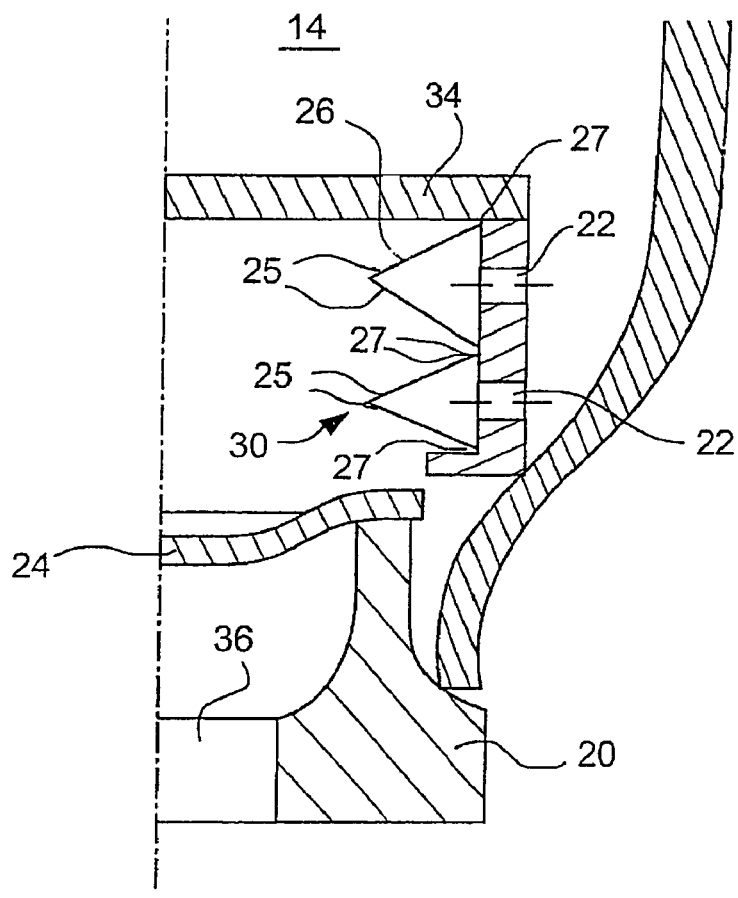
FIG. 10 shows a half section through a gas generator in accordance with a fifth embodiment of the invention.
Figure 11:
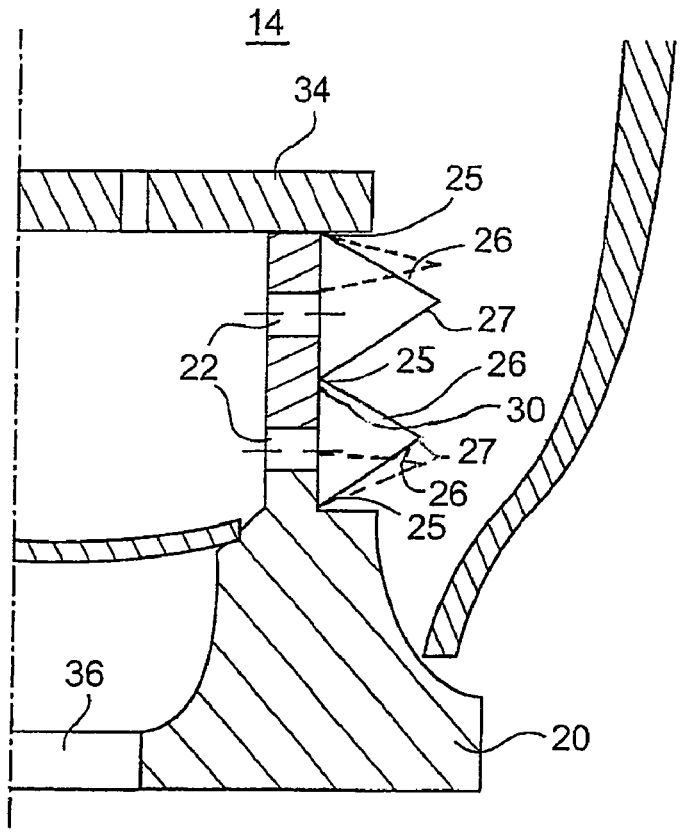
FIG. 11 shows a half section through a gas generator in accordance with a sixth embodiment of the invention.

FIGS. 10 and 11 show a fifth and a sixth embodiment of the gas generator 10 of the invention, in which the component immovable relative to the outer housing, in which a plurality of outflow openings 22 are formed here, is formed by a pot-shaped cap 34 arranged inside the chamber 14. The cap 34 surrounds an opening 36 of the chamber, which in the non-activated condition of the gas generator 10 is closed by a membrane 24. The outflow openings 22 are arranged on the periphery of the cap 34 and in the normal position are closed by a plurality of resilient elements 26, which are disc springs that are arranged one above the other and complement each other to form a bellows-like structure. The outer edges 27 (FIG. 10) and the inner edges 25 (FIG. 11) of the resilient elements 26 rest against the periphery of the cap 34. In the aspect as shown in FIG. 10, the resilient elements 26 are arranged behind the outflow openings 22, but before the membrane 24 with respect to the flow path of the compressed gas. In the aspect as shown in FIG. 11, the resilient elements 26 are arranged before the outflow openings 22 with respect to the flow path of the compressed gas. When a large enough force is exerted by the compressed gas, the resilient elements 26 undergo an elastic deformation (see broken lines) and clear a flow cross-section 30, which is respectively located between the edges 25 and 27 of two resilient elements 26 facing away from the cap 34. In this way, compressed gas can flow through the outflow openings 22 to the membrane 24, which is destroyed under a correspondingly high pressure, so that the compressed gas can flow out of the chamber 14 and hence the gas generator 10.

Figure 12:
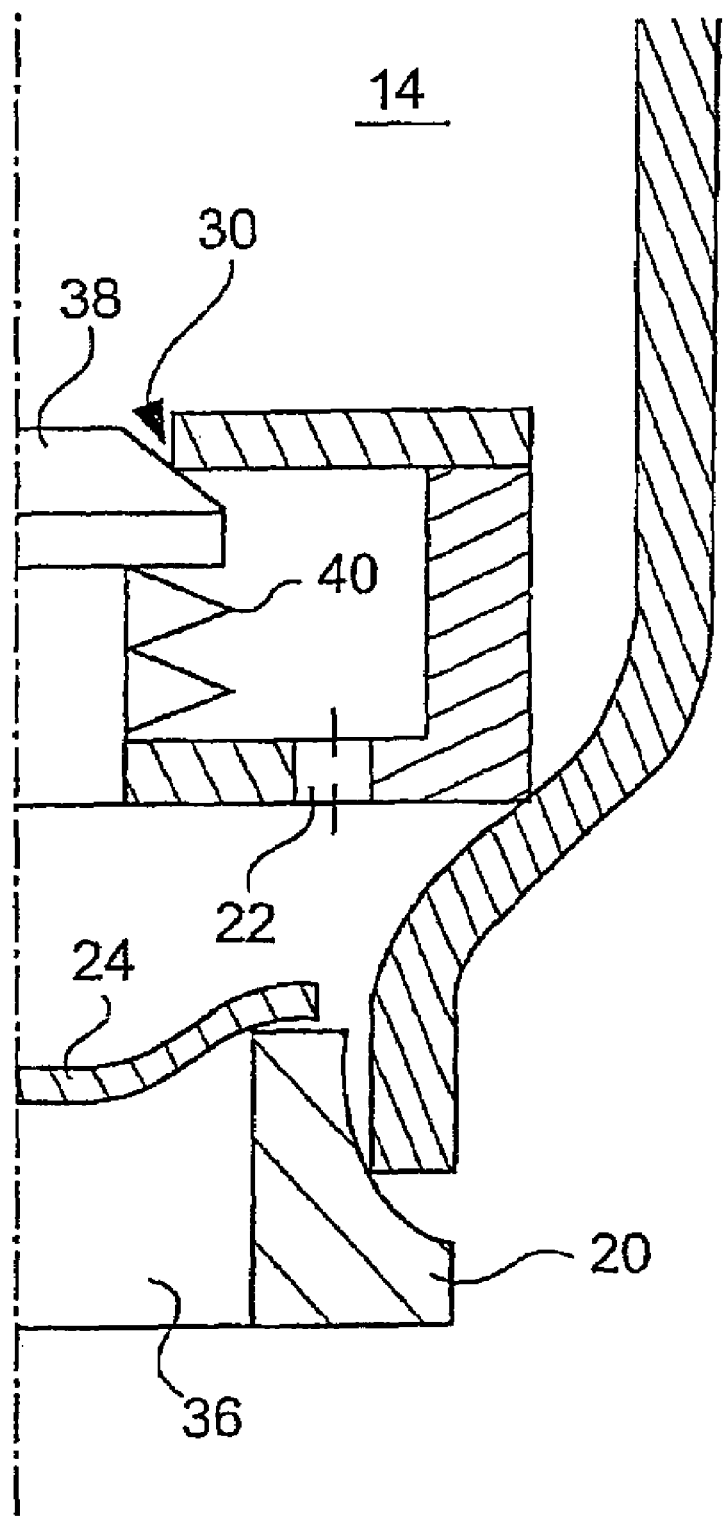
FIG. 12 shows a further aspect of a gas generator with variable outflow.

FIG. 12 finally shows a further aspect of a gas generator with variable outflow cross-section, in which a frustoconical plug 38, which is acted upon by a helical spring 40, initially closes a flow cross-section 30 and clears the same under the influence of a high enough pressure. The valve formed by the plug 38 and the helical spring 40 is arranged inside the chamber 14 upstream of the outflow openings 22. Such valve could of course also be arranged outside the chamber 14, for instance in the vicinity of a diffuser portion, as it is shown in FIG. 1.

Figure 13:
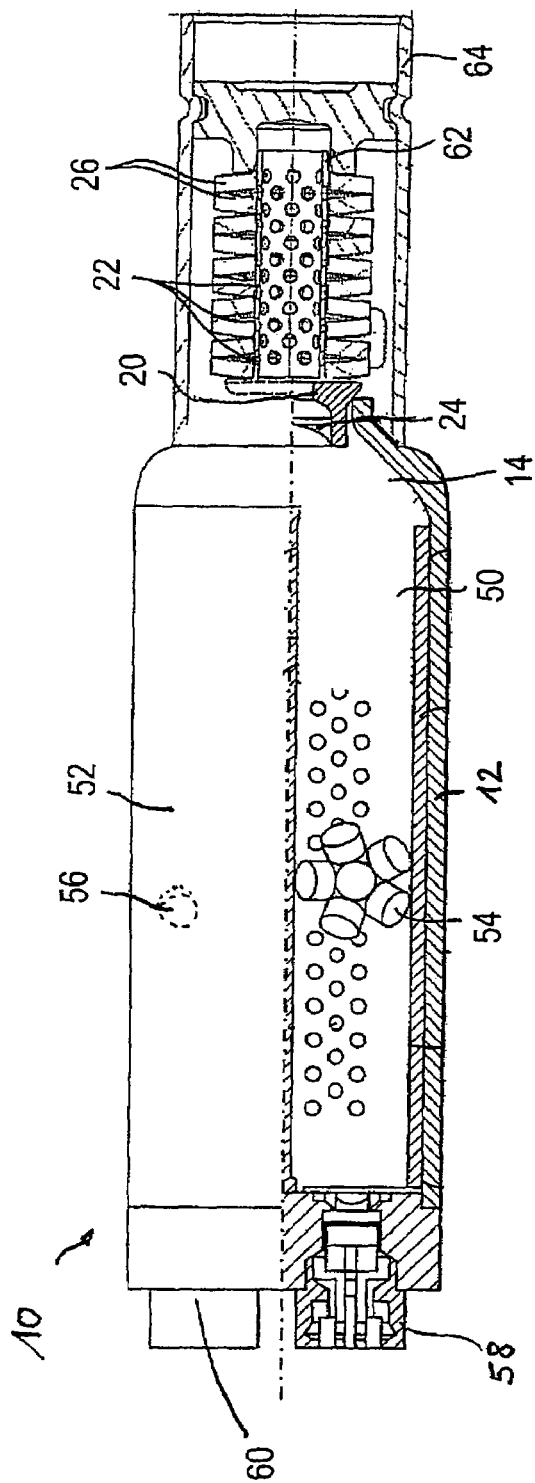
FIG. 13 shows a longitudinal sectional view through a further embodiment of the gas generator of the invention.

In the embodiment of FIG. 13, the gas generator has a chamber 14 which is filled with compressed gas and which in the longitudinal direction is divided into two individual chambers 50, 52. In the vicinity of the membrane 24, the individual chambers 50, 52 merge into each other. Both individual chambers 50, 52 comprise a pyrotechnical propellant charge 54, 56 which may be caused to deflagrate by means of an associated igniter 58, 60.

A sleeve-shaped diffuser 62 is applied to the outside of the closing element 20, which, of course, may also be part of the closing element 20 or of the outer housing. Resilient elements 26 (here disc springs) are arranged in line on the periphery of the diffuser 62 which is provided with a plurality of outflow openings 22. In the present case, an alternately inclined arrangement has been chosen so that a bellows-like structure is obtained.

When one stage or both stages is/are ignited and the membrane 24 is destroyed, a higher pressure prevails in the diffuser 62, which leads to a displacement of the resilient elements 26 so that gaps are formed between adjacent resilient elements 26, via which gas escapes. The width of the gap depends on the prevailing pressure. The resilient elements 26 should be axially biased such that a rattling cannot occur during operation.

Figure 14:
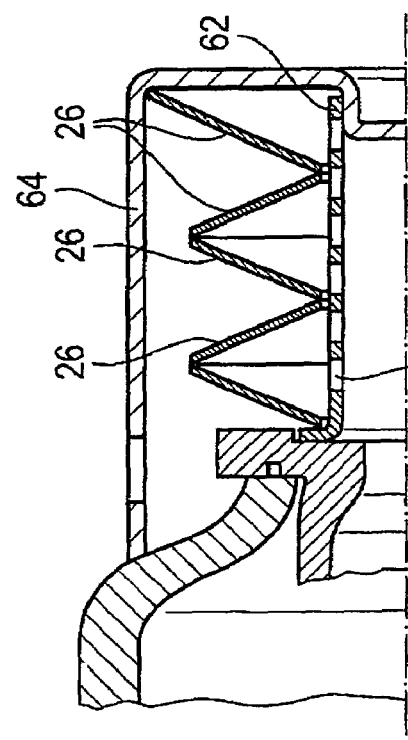
FIG. 14 shows a longitudinal sectional view through the outflow end of a further embodiment of the gas generator of the invention.

In the embodiment according to FIG. 14, the last disc spring is slightly larger and rests against the axial end of a part 64 of the outer housing 12 of the gas generator 10, which surrounds the diffuser 62.

The invention claimed is:

1. A gas generator for a vehicle occupant restraint system:
   a rigid outer housing (12),
   a chamber (14) within said outer housing (12), in which a compressed gas is present at least upon activation of said gas generator (10),
   a component (20; 34; 62) immovable relative to said outer housing (12),
   at least one outflow opening (22) formed in said immovable component (20; 34; 62) and
   at least one resilient element (26), which is clamped inside said outer housing (12) and rests against said immovable component (20; 34; 62) at least in its normal position,
   wherein said resilient element (26) in its normal position closes a flow path between said chamber (14) and external surroundings of said gas generator (10) and under the influence of compressed gas is deformed elastically, whereby it clears a flow cross-section (30) whose size is increasing with increasing pressure.

2. The gas generator according to claim 1, wherein said immovable component is a closing element (20) of said chamber (14), in which said outflow opening (22) is arranged.

3. The gas generator according to claim 2, wherein at least in its normal position said resilient element (26) rests against said closing element (20) so as to radially surround said outflow opening (22) on the outside.

4. The gas generator according to claim 2, wherein a membrane (24) is attached to said closing element (20), which closes said outflow opening (22) prior to activation of said gas generator (10).

5. The gas generator according to claim 2, wherein at least one exit opening (18) is provided in said outer housing (12) in the vicinity of said closing element (20).

6. The gas generator according to claim 1, wherein at least in its normal position said resilient element (26) directly rests on said outer housing (12) in addition to resting against said immovable component (20; 34; 62).

7. The gas generator according to claim 1, wherein at least in its normal position said element (26) rests on a stop (32) which is immovable relative to said outer housing (12) in addition to resting against said immovable component (20; 34; 62).

8. The gas generator according to claim 1, wherein said chamber (14) has an opening (36), said immovable component being a cap (34) arranged inside said chamber (14), said cap (34) being adjacent to said opening (36) of said chamber (14) and having a diameter that is greater than the diameter of said opening (36).

9. The gas generator according to claim 8, wherein said immovable component includes a plurality of outflow openings (22) arranged on its periphery, which in its normal position are closed by said resilient element (26).

10. The gas generator according to claim 8, wherein said resilient element (26) rests against the periphery of said immovable component.

11. The gas generator according to claim 1, wherein said immovable component is a component of said diffuser (62) arranged outside said chamber (14).

12. The gas generator according to claim 1, wherein said resilient element (26) is arranged downstream of said outflow opening (22).

13. The gas generator according to claim 1, wherein said resilient element (26) is arranged upstream of said outflow opening (22).

14. The gas generator according to claim 1, wherein said resilient element (26) is a disc spring.

15. The gas generator according to claim 14, wherein a plurality of disc springs are provided.

16. The gas generator according to claim 15, wherein a plurality of disc springs are provided, which are arranged one above the other and complement each other to form a bellows-like structure.

17. The gas generator according to claim 1, wherein said resilient element (26) has the shape of a spherical shell portion.

18. The gas generator according to claim 1, wherein said resilient element (26) has the shape of spherical cap.

19. The gas generator according to claim 1, wherein it is a hybrid gas generator.

20. The gas generator according to claim 19, wherein said chamber (14) is a cold gas container.

\* \* \* \* \*